US010772148B2

(12) United States Patent
Kim

(10) Patent No.: US 10,772,148 B2
(45) Date of Patent: Sep. 8, 2020

(54) METHOD AND APPARATUS FOR MANAGING PDU SESSION BETWEEN BASE STATION AND CORE NETWORK IN NEXT-GENERATION WIRELESS NETWORK

(71) Applicant: KT CORPORATION, Gyeonggi-do (KR)

(72) Inventor: Ha Sung Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 122 days.

(21) Appl. No.: 15/967,512

(22) Filed: Apr. 30, 2018

(65) Prior Publication Data

US 2018/0317273 A1 Nov. 1, 2018

(30) Foreign Application Priority Data

Apr. 28, 2017 (KR) .................. 10-2017-0054983
Jan. 2, 2018 (KR) .................. 10-2018-0000256

(51) Int. Cl.
*H04W 76/20* (2018.01)
*H04W 28/02* (2009.01)
*H04W 92/04* (2009.01)
*H04W 80/12* (2009.01)

(52) U.S. Cl.
CPC ....... *H04W 76/20* (2018.02); *H04W 28/0268* (2013.01); *H04W 80/12* (2013.01); *H04W 92/045* (2013.01)

(58) Field of Classification Search
CPC ..... H04W 76/20; H04W 76/15; H04W 76/18; H04W 76/30; H04W 76/12; H04W 72/04; H04W 28/0268; H04W 80/12; H04W 92/045

See application file for complete search history.

(56) References Cited

U.S. PATENT DOCUMENTS

| | | |
|---|---|---|
| 2016/0050601 A1 | 2/2016 | Jeong et al. |
| 2016/0262068 A1 | 9/2016 | Won et al. |
| 2016/0360439 A1 | 12/2016 | Phan et al. |
| 2017/0041752 A1 | 2/2017 | Baek et al. |
| 2017/0070892 A1 | 3/2017 | Song et al. |
| 2017/0272993 A1 | 9/2017 | Jeong et al. |
| 2017/0289046 A1* | 10/2017 | Faccin ............... H04L 47/2441 |

(Continued)

FOREIGN PATENT DOCUMENTS

KR 10-2016-0106520 A 9/2016
KR 10-2017-0030058 A 3/2017

*Primary Examiner* — Kibrom T Hailu
(74) *Attorney, Agent, or Firm* — IP Legal Services, LLC

(57) ABSTRACT

Provided is a method for managing a packet data unit (PDU) session between a base station and a core network in a next generation/5G radio access network (hereinafter, also referred to as NR (New Radio)). The method may include determining whether a requirement of a quality of service (QoS) flow for a terminal is satisfied, transmitting, to a core network entity, a PDU session resource notification message indicating that the requirement is not satisfied when the requirement is not satisfied, receiving one of a PDU session resource modification message and a PDU session resource release message from the core network entity, and transmitting a processing result on one of the PDU session resource modification message and the PDU session resource release message to the core network entity.

15 Claims, 9 Drawing Sheets

(56) References Cited

U.S. PATENT DOCUMENTS

| | | | |
|---|---|---|---|
| 2018/0049063 A1* | 2/2018 | Xu | ............ H04W 28/085 |
| 2018/0220346 A1 | 8/2018 | Won et al. | |
| 2018/0295556 A1 | 10/2018 | Baek et al. | |
| 2019/0037636 A1* | 1/2019 | Kim | ............ H04W 8/02 |

* cited by examiner

METHOD AND APPARATUS FOR MANAGING PDU SESSION BETWEEN BASE STATION AND CORE NETWORK IN NEXT-GENERATION WIRELESS NETWORK

CROSS REFERENCE TO RELATED APPLICATION

This application claims priority from Korean Patent Application Nos. 10-2017-0054983 & 10-2018-0000256, filed on Apr. 28, 2017 & Jan. 2, 2018, which are hereby incorporated by reference for all purposes as if fully set forth herein.

BACKGROUND OF THE INVENTION

1. Field of the Invention

Embodiments disclosed herein relate to a method for managing a packet data unit (PDU) session between a base station and a core network in a next generation/5G radio access network (hereinafter, also referred to as NR (New Radio)).

2. Description of the Prior Art

The typical long term evolution (LTE) supports bearer management for interworking with an LTE base station linked to an EPC, which is a core network, through an S1 interface and an application protocol.

Meanwhile, with the introduction of a 5G network, providing mobility between 5G base stations has become an essential factor. Especially, when a 5G base station uses a mmWave frequency of a high frequency band (e.g., 28 GHz), the coverage of the base station is expected to become smaller due to a frequency characteristic. Therefore, in this case, the frequency of a terminal moving through the base station is increased, and a handover procedure for this is also very important.

In addition, in 5G, a base station is constructed on a large scale and interworking with a 5G core network is essential. In this case, unlike bearer unit transmission between an LTE core network and a base station in the typical LTE, a Quality of Service (QoS) flow unit can perform quality control operation in 5G, and packet data may be transmitted between a 5G core network (hereinafter, also referred to as 5G core, 5G Core Network, NGC, or 5GC) and a 5G base station (hereinafter, also referred to as 5G NB, NR NB, NR-RAN, or gNB) through a Packet Data Unit (PDU) session including a QoS flow.

Therefore, the 5G base station is directly linked with the 5G core network, and a it is required to perform a PDU session management procedure based on an interface (hereinafter, also referred to as NG) between a 5G base station and a 5G core network and an NG Application Protocol (NGAP), which is an application protocol for the interface.

SUMMARY OF THE INVENTION

Embodiments disclosed herein provide a specific method capable of managing a 5G PDU session through interworking between a 5G core network and a 5G base station.

In order to solve the problems described above, an embodiment provides a method for managing a PDU session by a base station. The method includes: determining whether a requirement of a QoS flow for a terminal is satisfied; transmitting, to a core network entity, a PDU session resource notification message indicating that the requirement is not satisfied when it is determined that the requirement is not; receiving one of a PDU session resource modification message and a PDU session resource release message from the core network entity; and transmitting a processing result on one of the PDU session resource modification message and the PDU session resource release message to the core network entity.

In addition, an embodiment provides a method for managing a Packet Data Unit (PDU) session by a core network entity. The method includes: receiving a PDU session resource notification message indicating that a requirement of a QoS flow for a terminal is not satisfied, from a base station; transmitting one of a PDU session resource modification message and a PDU session resource release message to the base station; and receiving a processing result on one of the PDU session resource modification message and the PDU session resource release message from the base station.

In addition, an embodiment provides a base station that manages a Packet Data Unit (PDU) session. The base station includes: a controller configured to determine whether a requirement of a QoS flow for a terminal is satisfied; a receiver configured to receive one of a PDU session resource modification message and a PDU session resource release message from a core network entity; and a transmitter configured to transmit, to a core network entity, a PDU session resource notification message indicating that the requirement is not satisfied when it is determined that the requirement is not satisfied, and to transmit, to the core network entity, a processing result on one of the PDU session resource modification message and the PDU session resource release message.

Further, an embodiment provides a core network entity that manages a Packet Data Unit (PDU) session. The core network entity includes: a transmitter configured to transmit one of a PDU session resource modification message and a PDU session resource release message to a base station; and a receiver configured to receive a PDU session resource notification message indicating that a requirement of a QoS flow for a terminal from a base station is not satisfied, and to receive a processing result on one of a PDU session resource modification message and a PDU session resource release message from the base station.

In order to stably provide high-frequency, high transmission speed, high-reliability, and low-delay requirements, and various services, embodiments disclosed herein design an NG interface in a standard-based open type in 5G in which a number of small cell base stations are needed, so that efficient interworking between a 5G core network and a 5G base station, which are constructed by different equipment manufacturers, can be supported. Accordingly, it is possible to support more stable network connectivity through the present embodiment, and to reduce costs for constructing and operating a 5G base station and a 5G core network.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENTS

Figure 1:
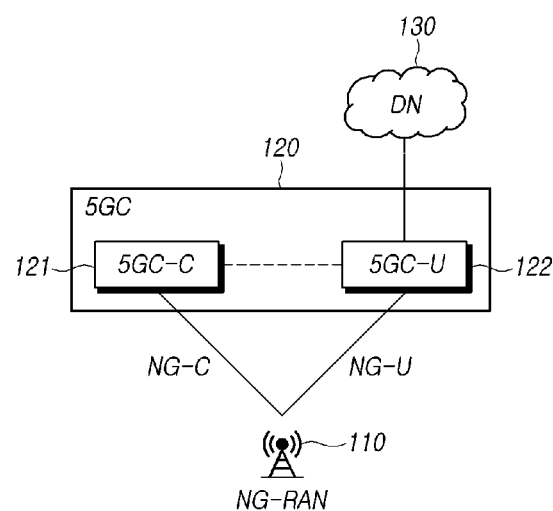
FIG. 1 is a diagram illustrating a 5G network structure and an NG interface according to embodiments.

Hereinafter, embodiments will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it may make the subject matter of the present disclosure rather unclear.

As used herein, a wireless communication system may denote a system for providing various communication services such as a voice service and a packet data service. The wireless communication system may include a User Equipment (UE) and a Base Station (BS or an eNB).

The user equipment may be a comprehensive concept that indicates a terminal for use in wireless communication, including a UE (User Equipment) in wideband code division multiple access (WCDMA), LTE, highspeed packet access (HSPA), international mobile telecommunication (IMT)-2020 (5G or New Radio), and the like, and a MS (Mobile station), a UT (User Terminal), an SS (Subscriber Station), a wireless device, and the like in global system for mobile communication (GSM).

A base station or a cell may generally refer to a station where communication with a User Equipment (UE) is performed, and means, inclusively, all of various coverage areas such as a Node-B, an evolved Node-B (eNB), gNode-B (gNB), Low Power Node (LPN), a Sector, a Site, various types of antennas, a Base Transceiver System (BTS), an Access Point, a Point (e.g., transmitting point, receiving point, or tranceiving point), a Relay Node, a Mega Cell, a Macro Cell, a Micrro Cell, a Pico Cell, a Femto Cell, a Remote Radio Head (RRH), a Radio Unit (RU), and a Small Cell.

Each of the above mentioned various cells has a base station that controls a corresponding cell, and thus, the base station may be construed in two ways. 1) the base station may be a device itself that provides a megacell, a macrocell, a microcell, a picocell, a femtocell, and a small cell in association with a wireless area, or 2) the base station may indicate a wireless area itself. In 1), a base station may be devices that interact with one another to provide a predetermined wireless area controlled by an identical entity or by cooperation of the devices. Based on a configuration type of a wireless area, a base station may include a point, a transmission/reception point, a transmission point, a reception point, or the like. In ii), a base station may be a wireless area itself that receives or transmits a signal from a perspective of a terminal or a neighboring base station.

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

In the specification, the user equipment and the base station are used as two (uplink or downlink) inclusive transceiving subjects to embody the technology and technical concepts described in the specifications, and the user equipment and the base station may not be limited to a predetermined term or word.

Here, Uplink (UL) refers to a scheme for a UE to transmit and receive data to/from a base station, and Downlink (DL) refers to a scheme for a base station to transmit and receive data to/from a UE.

Uplink transmission and downlink transmission may be performed i) using a TDD (Time Division Duplex) scheme that performs transmission based on different times, ii) using an FDD (Frequency Division Duplex) scheme that performs transmission based on different frequencies, or iii) using a mixed scheme of the TDD and FDD schemes.

Further, in a wireless communication system, a standard may be developed by configuring an uplink and a downlink based on a single carrier or a pair of carriers.

The uplink and the downlink may transmit control information through a control channel, such as a PDCCH (Physical Downlink Control CHannel), PUCCH (Physical Uplink Control CHannel), and the like. The uplink and downlink may transmit data through a data channel, such as PDSCH (Physical Downlink Shared CHannel), PUSCH (Physical Uplink Shared CHannel), and the like.

A downlink may refer to communication or a communication path from a multi-transmission/reception point to a terminal, and an uplink may refer to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, a situation of transmitting and receiving signals through a channel such as a PUCCH, a PUSCH, a PDCCH, or a PDSCH will be expressed as the transmission and reception of a PUCCH, a PUSCH, a PDCCH, or a PDSCH.

Meanwhile, higher layer signaling includes an RRC signaling that transmits RRC information including an RRC parameter.

A base station performs downlink transmission to terminals. A base station may transmit a physical downlink control channel for transmitting downlink control information such as scheduling required to receive a downlink data channel that is a main physical channel for unicast transmission, and scheduling approval information for transmission on an uplink data channel. Hereinafter, transmission and reception of a signal through each channel will be described as transmission and reception of a corresponding channel.

Varied multiple access schemes may be unrestrictedly applied to the wireless communication system. Various multiple access schemes, such as TDMA (Time Division Multiple Access), FDMA (Frequency Division Multiple Access), CDMA (Code Division Multiple Access), OFDMA (Orthogonal Frequency Division Multiple Access), NOMA (Non-Orthogonal Multiple Access), OFDM-TDMA, OFDM-FDMA, OFDM-CDMA, and the like may be used. Here, NOMA includes SCMA (Sparse Code Multiple Access), LDS (Low Cost Spreading), and the like.

Embodiments of the present disclosure may be applicable to resource allocation in an asynchronous wireless communication scheme that evolves into LTE/LTE-advanced and IMT-2020 through GSM, WCDMA, and HSPA. Embodiments may be applicable to resource allocation in a synchronous wireless communication scheme that evolves into CDMA, CDMA-2000, and UMB.

In the present specifications, a machine type communication (MTC) terminal refers to a terminal that is low cost (or is not very complexity), a terminal that supports coverage enhancement, or the like. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the typical LTE coverage, or supports low power consumption, or the MTC terminal may refer to a newly defined Release 13 low cost (or low complexity) UE category/type. Alternatively, the MTC terminal may refer to a further Enhanced MTC terminal defined in Release-14.

In this specification, a NarrowBand Internet of Things (NB-IoT) terminal means a terminal supporting wireless access for a cellular Internet of thing (IoT). Objectives of the NB-IoT technology include improved indoor coverage, support for a large-scale low-rate terminal, low latency sensitivity, very low terminal costs, low power consumption, and an optimized network structure.

Enhanced Mobile BroadBand (eMBB), massive Machine Type Communication (mMTC), and Ultra Reliable and Low Latency Communication (URLLC) have been proposed as typical usage scenarios in NR (New Radio), which is under discussion in 3GPP.

In this specification, a frequency, a frame, a sub-frame, a resource, a resource block, a region, a band, a sub-band, a control channel, a data channel, a synchronization signal, various reference signals, various signals, and various messages related to NR may be interpreted in meanings used in the past, currently used meanings, or various meanings to be used in the future.

The present disclosure discloses contents related to a structure of a 5G core network and a 5G base station, an NG interworking interface between a 5G core network and a 5G base station (hereinafter, also referred to as a CN-RAN), a PDU session management procedure based on an NG Application Protocol (NGAP), messages, and related information elements.

The 5G network is divided into a 5G core network (hereinafter, also referred to as 5GC, 5G CN, NGC, or the like) and a 5G radio access network (hereinafter, also referred to NG-RAN, 5G-RAN, or the like). The NG-RAN may be composed of a set of 5G NBs (gNBs), which are one or more 5G base station nodes. In addition, an entity constituting the core network described above may be referred to as a core network entity. The core network entity may mean a 5GC-C or a 5GC-U, which will be described below, or may mean a set of one or more 5GC-Cs and one or more 5GC-Us.

FIG. 1 is a diagram illustrating a 5G network structure and an NG interface according to embodiments.

Referring to FIG. 1, a 5GC 120 may include a 5GC-C 121 and a 5GC-C 122, and the 5GC-U 122 may be connected to an external Data Network (DN) 130. An interface between the 5GC 120 and an NG-RAN (hereinafter, also referred to as 5G NB) 110 may be interfaced with an NG (or N2/N3) interface, and one or more 5G NBs may be individually connected to one 5GC. At this time, the 5GC-C (hereinafter, also referred to as 5G CN-C, AMF, SMF, a combination thereof, or the like) 121 is responsible for a control plane of 5GC, and the 5GC-U (hereinafter, also referred to as 5G CN-U, UPF, UPGW, or the like) 122 and the NG-RAN 110 are responsible for a user plane of 5GC. The 5GC-C 121, the 5GC-U 122, and the NG-RAN 110 may be interfaced with the NG-C interface and the NG-U interface, respectively. In particular, the 5GC-C 121 is an end point of an NG interface responsible for mobility control, and the session management function or the like thereof may be separately configured.

Meanwhile, the 5G NB may be further divided into a Central Unit (CU) and a Distributed Unit (DU) device, and one or more DUs may be connected to one CU.

The NG-C interface may be connected between the 5GC-C 121 and the 5G NB 110, and the NG-U interface may be connected between the 5GC-U 122 and the 5G NB 110. According to the network structure, an NG interface may be directly connected to the DU of the 5G NB 110. In this case, a GTP Tunneling Endpoint ID (GTP-TEID) for identifying the GTP transmission tunnel end point for the NG interface may be defined for the 5GC-C, 5GC-U, 5G NB, CU, and DU.

In the present embodiment, 5G PDU session management (notification, change, release) procedures through an NG-C interface will be described.

The embodiments described below may be applied to a terminal, a base station, and a core network entity using all mobile communication technologies. For example, the present embodiments may also be applied to a next generation mobile communication (5G mobile communication, New-RAT, or NR) terminal, a base station, an Access and Mobility Function (AMF), and a Session Management Function (SMF).

Hereinafter, a base station may indicate a base station (CU, DU, or a single logical entity implemented with a CU and a DU) or a gNB in a 5G wireless network in which a CU and a DU are separated. As described above, a core network entity may indicate a 5GC-C, which is responsible for a control plane as a component of the 5G core network.

In addition, a session may indicate a Packet Data Unit (PDU) session for packet data transmission.

In addition, an NG Application Protocol (NGAP) message may be a message transmitted and received through the NGAP. For example, the NGAP message may include a PDU session indication message, a PDU session modification request message, a PDU session release command message, a PDU session modification response message, a PDU session modification failure message, a PDU session release response message, a PDU session release failure message, or the like.

Figure 2:
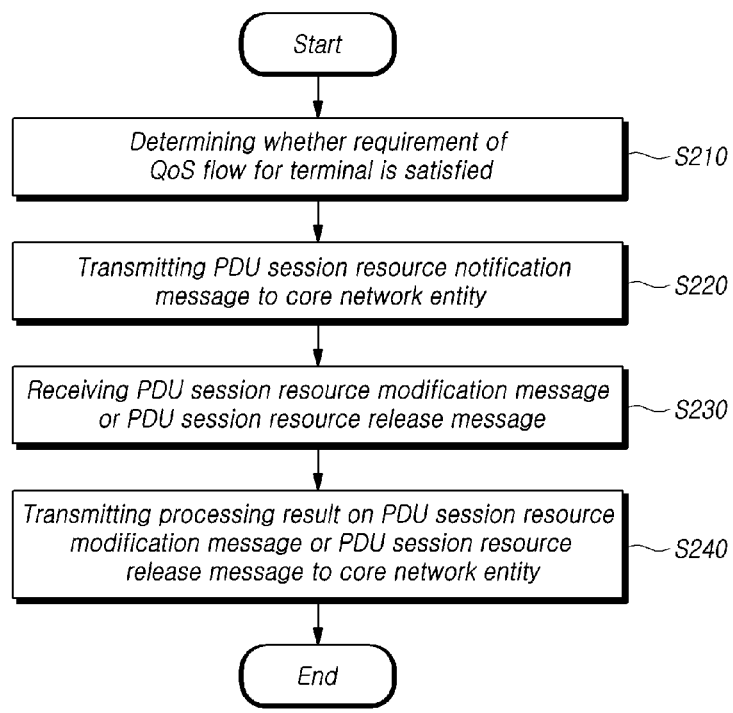
FIG. 2 is a diagram illustrating a procedure of a base station for managing a PDU session according to an embodiment.

FIG. 2 is a diagram illustrating a procedure of a base station for managing a PDU session according to an embodiment.

Referring to FIG. 2, the base station may determine whether a requirement of a QoS flow for a terminal is satisfied (S210).

At this time, the parameters for the above-described QoS flow may include an identifier of the QoS flow, a transmission rate (minimum value/guarantee value/maximum value) of the QoS flow, information on characteristics of the QoS (Guaranteed Bit Rate (GBR)/Non-Guaranteed Bit Rate (Non-GBR) type, priority, packet delay, packet error rate, etc.), Allocation and Retention Priority (ARP) information, and the like. The base station may determine whether the requirement for the QoS flow is currently satisfied based on such parameter information.

When it is determined that the requirement for the QoS flow is not satisfied, the base station transmits a PDU session resource notification message indicating that the requirement of the QoS flow is not satisfied to the core network entity (S220).

At this time, the PDU session resource notification message may be transmitted through a PDU session indication message, which is an NGAP message, and the PDU session resource notification message may include the identifier of the QoS flow described above and information on the cause why the requirement of the QoS flow is not satisfied.

In addition, the base station may receive at least one of a PDU session resource modification message and a PDU session resource release message from the core network entity (S230).

Upon receiving the PDU session resource notification message from the base station, the core network entity may determine whether to perform one of PDU session modification and PDU session release in order to satisfy the requirement for the QoS flow described above and may transmit the determined information to the base station to request PDU session modification or PDU session release.

At this time, when the core network entity requests the base station to modify the PDU session, the core network entity may transmit a PDU session modification request message, which is an NGAP message, to the base station.

At this time, when the core network entity requests the base station to release the PDU session, the core network entity may transmit a PDU session release command message, which is an NGAP message, to the base station.

Finally, the base station may transmit one of the processing result for the above-described PDU session resource modification message and the processing result for the PDU session resource release message to the above-described core network entity (S240).

Upon receiving one of the PDU session resource modification message and PDU session resource release message, the base station may perform a procedure for modifying and confirming a data radio bearer (a DRB for a data bearer or an SRB serving as a signaling bearer) connected to a terminal based on a new PDU session including a new QoS flow or network slice information. At this time, the base station may transmit a message for performing the procedure to the terminal through RRC signaling. In addition, update may be made to a network slice between the base station and the terminal, between the base station and the core network, or between the terminal and the core network, if necessary.

At this time, the base station may store network slice assistance information on the managed PDU session. The network slice support information denotes a parameter required for selecting a network slice for a PDU session.

In the case where the base station transmits the processing result on the PDU session resource modification message to the core network entity, when the PDU session resource modification is completed, the base station transmits a PDU session modification response message (e.g., an NGAP message) to the core network entity, thereby notifying that the PDU session resource modification has been completed. On the other hand, when the bearer/slice modification between the base station and the terminal has failed and thus the PDU session resource modification has failed, the base station transmits a PDU session modification failure message (e.g., an NGAP message) to the core network entity, thereby notifying that the PDU session resource modification has failed.

In the case where the base station transmits the processing result on the PDU session resource release message to the core network entity, when the PDU session resource release is completed, the base station transmits a PDU session release response message (e.g., an NGAP message) to the core network entity, thereby notifying that the PDU session resource release has been completed. On the other hand, when the bearer/slice release between the base station and the terminal has failed and thus the PDU session resource release has failed, the base station transmits a PDU session release failure message (e.g., an NGAP message) to the core network entity, thereby notifying that the PDU session resource release has failed.

As described above, the PDU session resource notification message, the PDU session resource modification message, and the PDU session resource release message may be transmitted through an NG Application Protocol (NGAP) message. At this time, at least one of a PDU session identifier, a QoS flow identifier, and a network slice identifier may be included in the PDU session resource notification message, the PDU session resource modification message, and the PDU session resource release message as information on the PDU session management.

Figure 3:
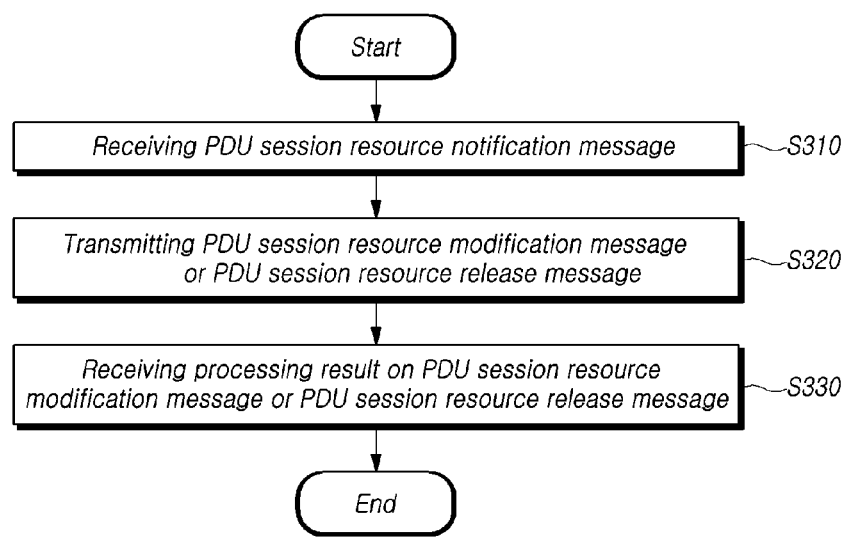
FIG. 3 is a diagram illustrating a procedure of a core network entity for managing a PDU session according to an embodiment.

FIG. 3 is a diagram illustrating a procedure of a core network entity for managing a PDU session in the present embodiment.

Referring to FIG. 3, the core network entity may receive a PDU session resource notification message indicating that the requirement of the QoS flow for the terminal is not satisfied, from the base station (S310).

At this time, the PDU session resource notification message may be transmitted through a PDU session indication message (e.g., an NGAP message) and the PDU session resource notification message may include the identifier of the QoS flow described above and information on the cause why the requirement of the QoS flow is not satisfied.

In addition, the core network entity may transmit one of a PDU session resource modification message and a PDU session resource release message to the base station (S320).

Upon receiving the PDU session resource notification message from the base station, the core network entity may determine whether to perform PDU session modification or PDU session release in order to satisfy the requirement for the QoS flow described above and may transmit the determined information to the base station to request PDU session modification or PDU session release.

At this time, when the core network entity requests the base station to modify the PDU session, the core network entity may transmit a PDU session modification request message (e.g., an NGAP message) to the base station.

At this time, when the core network entity requests the base station to release the PDU session, the core network entity may transmit a PDU session release command message, which is an NGAP message, to the base station.

In addition, the core network entity may receive one of i) the processing result for the above-described PDU session resource modification message and ii) the processing result for the PDU session resource release message from the base station (S330).

Upon receiving one of the PDU session resource modification message and PDU session resource release message, the base station may perform a procedure for modifying and confirming a data radio bearer (a DRB for a data bearer or an SRB serving as a signaling bearer) connected to a terminal based on a new PDU session including a new QoS flow or network slice information. At this time, the base station may transmit a message for performing the procedure to the terminal through RRC signaling. In addition, update may be made to a network slice between the base station and the terminal, between the base station and the core network, or between the terminal and the core network, if necessary.

At this time, the base station may store network slice assistance information on the managed PDU session. The network slice support information may be a parameter required for selecting a network slice for a PDU session.

In the case where the base station transmits the processing result on the PDU session resource modification message to the core network entity, when the PDU session resource modification is completed, the base station transmits a PDU session modification response message (e.g., an NGAP message) to the core network entity, thereby notifying that the PDU session resource modification has been completed. On the other hand, when the bearer/slice modification between the base station and the terminal has failed and thus the PDU session resource modification has failed, the base station transmits a PDU session modification failure message (e.g, an NGAP message) to the core network entity, thereby notifying that the PDU session resource modification has failed.

In the case where the base station transmits the processing result on the PDU session resource release message to the core network entity, when the PDU session resource release is completed, the base station transmits a PDU session release response message (e.g., an NGAP message) to the core network entity, thereby notifying that the PDU session resource release has been completed. On the other hand, when the bearer/slice release between the base station and the terminal has failed and thus the PDU session resource release has failed, the base station transmits a PDU session release failure message (e.g., an NGAP message) to the core network entity, thereby notifying that the PDU session resource release has failed.

Accordingly, the core network entity may confirm the processing result for the PDU session resource modification response message through the PDU session modification response message or the PDU session modification failure message received from the base station. Alternatively, the core network entity may confirm the processing result for the PDU session resource release response message through the PDU session release response message or the PDU session release failure message received from the base station.

As described above, the PDU session resource notification message, the PDU session resource modification message, and the PDU session resource release message may be transmitted through an NG Application Protocol (NGAP) message. At this time, at least one of a PDU session identifier, a QoS flow identifier, and a network slice identifier may be included in the PDU session resource notification message, the PDU session resource modification message, and the PDU session resource release message as information on the PDU session management.

Hereinafter, more embodiments of a method for managing a PDU session by a base station and a core network entity will be described in detail.

The embodiments described below may be applied individually or in any combination.

Embodiment 1: 5G PDU Session Management (Notification, Modification, Release) Procedure As described above, 5G QoS flow parameters may include an identifier of the QoS flow, a transmission rate (e.g., minimum value/guarantee value/maximum value) of the QoS flow, information on characteristics of the QoS (e.g., Guaranteed Bit Rate (GBR)/Non-Guaranteed Bit Rate (Non-GBR) type depending on whether a specific bandwidth is ensured, priority, packet delay, packet error rate, etc.), Allocation and Retention Priority (ARP) information, and the like.

At this time, a notification function for a QoS flow may or may not be supported. When the notification function is supported, a field for the notification for the QoS flow may be included in the QoS flow parameters.

Hereinafter, descriptions will be described separately according to whether or not the notification function for the QoS flow is supported.

Embodiment 1-1: When Notification Function for QoS Flow is Supported

When a QoS requirement is not satisfied for a QoS flow for a terminal, a base station needs to notify the 5GC-C that the requirement is not satisfied. At this time, the base station may notify the 5GC-C that the requirement is not satisfied using a PDU session indication message as the NGAP message. At this time, the PDU session indication message may include a flow identifier and information on the cause why the requirement of the QoS flow is not satisfied.

On the other hand, a modification may be made to an attribute or requirement of a network slice in 5G. Therefore, even if the requirement for the corresponding network slice is not satisfied, the base station may also notify the 5GC-C that the requirement is not satisfied for the network slice. At this time, the base station may also notify the 5GC-C that the requirement is not satisfied using a PDU session indication message as the NGAP message. At this time, the PDU session indication message may include i) a QoS flow identifier, ii) a network slice identifier, and iii) information on the cause why the requirement of the QoS flow is not satisfied.

Upon receiving the corresponding notification from the base station, the 5GC-C may determine PDU session modification or PDU session release in order to match the QoS flow with the requirement for the corresponding QoS flow.

When a PDU session modification is determined, the 5GC-C may request a PDU session modification by transmitting a PDU session modification request message, which is an NGAP message, to the base station.

When PDU session release is determined, the 5GC-C may request PDU session release by transmitting a PDU session release command message, which is an NGAP message, to the base station.

Upon receiving one the PDU session modification request message and the PDU session release command message, the base station may perform a procedure for modifying and confirming a data radio bearer (e.g., a DRB for a data bearer or an SRB serving as a signaling bearer) connected to a terminal according to a new PDU session including a new QoS flow or network slice information. At this time, the above-described procedure may be performed through RRC signaling. At this time, if necessary, a slice update procedure between the base station and the terminal, between the base station and the 5GC, or between the terminal and the 5GC may also be performed.

When a data radio bearer or network slice modification is successful between the base station and a terminal, the base station may notify the 5GC-C of the completion by transmitting a PDU session modification response message, which is an NGAP message.

When a data radio bearer or network slice release is successful between the base station and a terminal, the base station may notify the 5GC-C of the completion by transmitting a PDU session release response message, which is an NGAP message.

When a data radio bearer or the network slice modification fails between the base station and a terminal, the base station may notify the 5GC-C of the failure in executing a request by transmitting a PDU session modification failure message, which is a NGAP message, to the 5GC-C (however, the 5GC-C may not use the corresponding message).

When a data radio bearer or the network slice release fails between the base station and a terminal, the base station may notify the 5GC-C of the failure in executing a request by transmitting a PDU session release failure message, which is a NGAP message, to the 5GC-C (however, the 5GC-C may not use the corresponding message).

Figure 4:
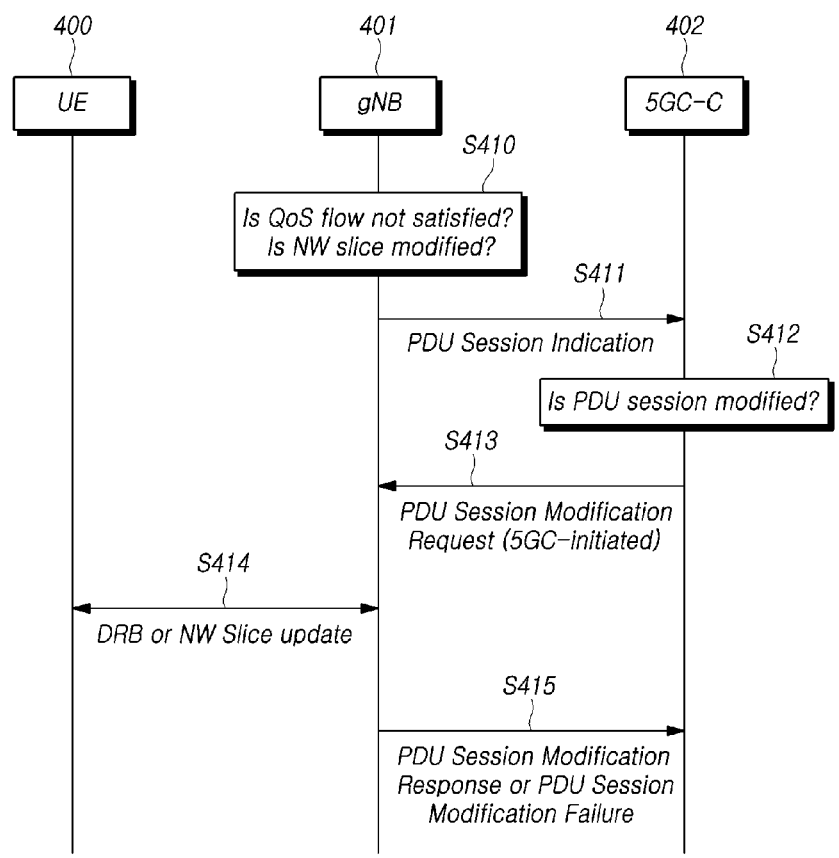
FIG. 4 is a diagram illustrating a PDU session modification procedure when a QoS flow supports a notifying function according to an embodiment.

FIG. 4 is a diagram illustrating a PDU session modification procedure when a QoS flow supports a notification function according to an embodiment.

Referring to FIG. 4, a base station (gNB) 401 may determine whether or not a requirement for a QoS flow for a terminal (UE) 400 is not satisfied or whether or not a modification occurs in a network slice (NW Slice) (S410).

When the requirement for the QoS flow is not satisfied or a modification occurs in the network slice, the base station 401 may transmit a PDU session indication message, which is an NGAP message, to a core network entity (5GC-C) 402 as a PDU session resource notification message (S411).

The core network entity 402 may determine whether to request a modification to a PDU session based on the received PDU session resource notification message (S412). When requesting a modification, the core network entity 402 may transmit a PDU session modification request message, which is an NGAP message, to the base station 401 as a PDU session resource modification message (S413).

On the other hand, upon receiving the PDU session resource modification message from the core network entity 402, the base station 401 may perform a Data Radio Bearer (DRB) or network (NW) slice update based on the corresponding message (S414).

The base station 401 may then transmit the processing result for the PDU session resource modification message to the core network entity 402 (S415). When the corresponding request is successfully performed, the PDU session modification response message, which is an NGAP message, is transmitted. When the request fails, the PDU session modification failure message, which is an NGAP message, may be transmitted.

Figure 5:
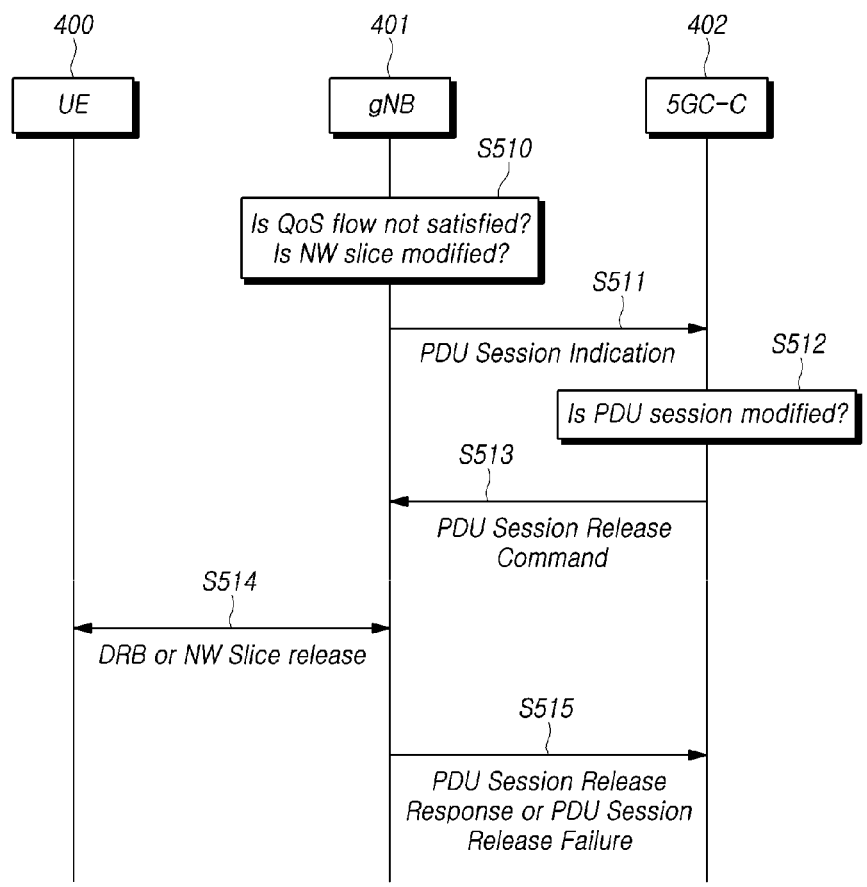
FIG. 5 is a diagram illustrating a PDU session release procedure when a QoS flow supports a notifying function according to an embodiment.

FIG. 5 is a diagram illustrating a PDU session release procedure when a QoS flow supports a notifying function according to an embodiment.

Referring to FIG. 5, a base station (gNB) 401 determines whether or not a requirement of a QoS flow for a terminal (UE) 400 is not satisfied or whether or not a modification occurs in a network slice (NW Slice) (S510).

When the requirement of the QoS flow is not satisfied or a modification occurs in the network slice, the base station 401 may transmit a PDU session indication message, which is an NGAP message, to a core network entity (5GC-C) 402 as a PDU session resource notification message (S511).

The core network entity 402 may determine whether to request release to a PDU session based on the received PDU session resource notification message (S512). When requesting release, the core network entity 402 may transmit a PDU session release request message (e.g., an NGAP message) to the base station 401 as a PDU session resource modification message (S513).

On the other hand, upon receiving the PDU session resource release message from the core network entity 402, the base station 401 may perform a DRB or NW slice update based on the corresponding message (S514).

The base station 401 may then transmit the processing result for the PDU session resource release message to the core network entity 402 (S515). When the corresponding request is successfully performed, the PDU session release response message (e.g., an NGAP message) is transmitted. When the request fails, the PDU session release failure message (e.g., an NGAP message) may be transmitted.

Embodiment 1-2: when Notification Function for QoS Flow is not Supported

When the base station determines that a QoS requirement for a corresponding QoS flow is not satisfied or when the base station determines that a network slice requirement is not satisfied, the base station may directly transmit one of a PDU session modification request message and a PDU session release command message (e.g., an NGAP message) to the 5GC-C. At this time, the PDU session modification request message or PDU session release command message may include i) a QoS flow identifier, ii) a slice identifier, and iii) information on the cause why the requirement is not satisfied.

When the modification to the PDU session is completed, the 5GC-C may notify the base station of the completion by transmitting a PDU session modification response message (e.g., an NGAP message) to the base station.

When the release for the PDU session is completed, the 5GC-C may notify the base station of the completion by transmitting a PDU session release response message (e.g., an NGAP message) to the base station.

When the modification request for the PDU session cannot be accepted, the 5GC-C may notify the base station of the failure in executing the request by transmitting the PDU session modification failure message (e.g., an NGAP message) to the base station (note that the corresponding message may not be used by the base station).

When the release request for the PDU session cannot be accepted, the 5GC-C may notify the base station of the failure in executing the request by transmitting the PDU session release failure message (e.g., an NGAP message) to the base station (note that the corresponding message may not be used by the base station).

Figure 6:
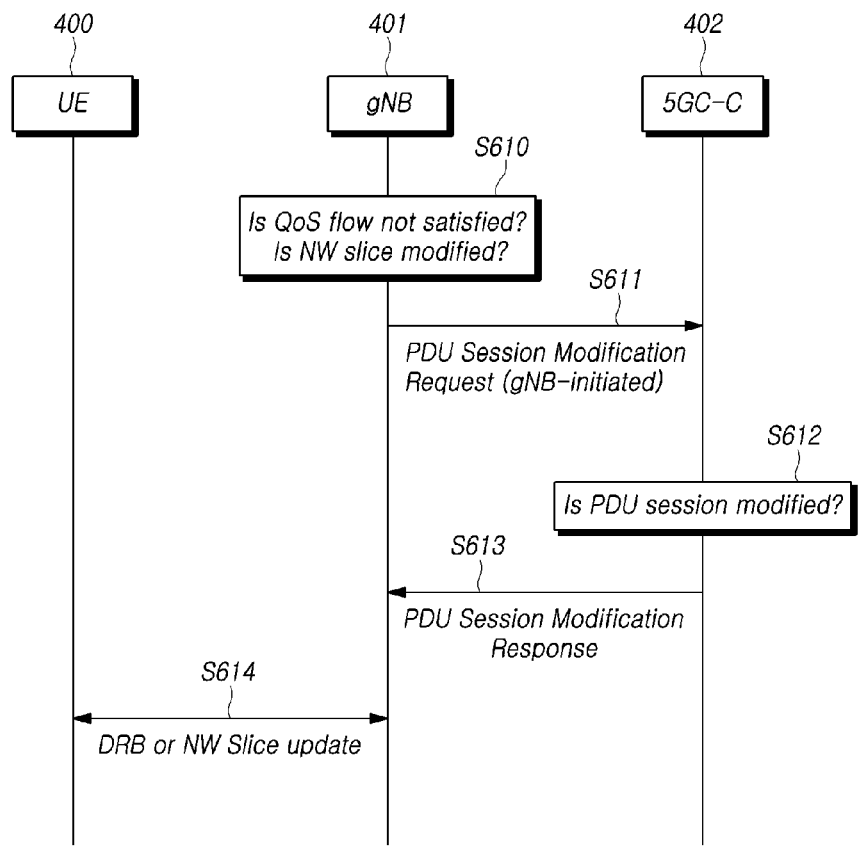
FIG. 6 is a diagram illustrating a PDU session modification procedure when a QoS flow does not support a notifying function according to an embodiment.

FIG. 6 is a diagram illustrating a PDU session modification procedure when a QoS flow does not support a notifying function according to an embodiment.

Referring to FIG. 6, a base station (gNB) 401 may determine whether a requirement for a QoS flow for a terminal (UE) 400 is not satisfied or whether a modification is made in an NW slice (S610).

When the requirement for the QoS flow is not satisfied or when a modification is made in the network slice, the base station 401 may transmit a PDU session modification request message, which is an NGAP message, to a core network entity (5GC-C) 402 as a PDU session resource modification message (S611).

Upon receiving the PDU session resource modification message described above, the core network entity 402 processes a request for the PDU session modification (S612). When the process for the corresponding request is successful, the core network entity 402 transmits a PDU session modification response message, which is an NGAP message, to the base station (S613).

On the other hand, upon receiving the PDU session modification response message from the core network entity 402, the base station 401 may perform a DRB or NW slice update with the terminal 400 based on the corresponding message (S614).

Figure 7:
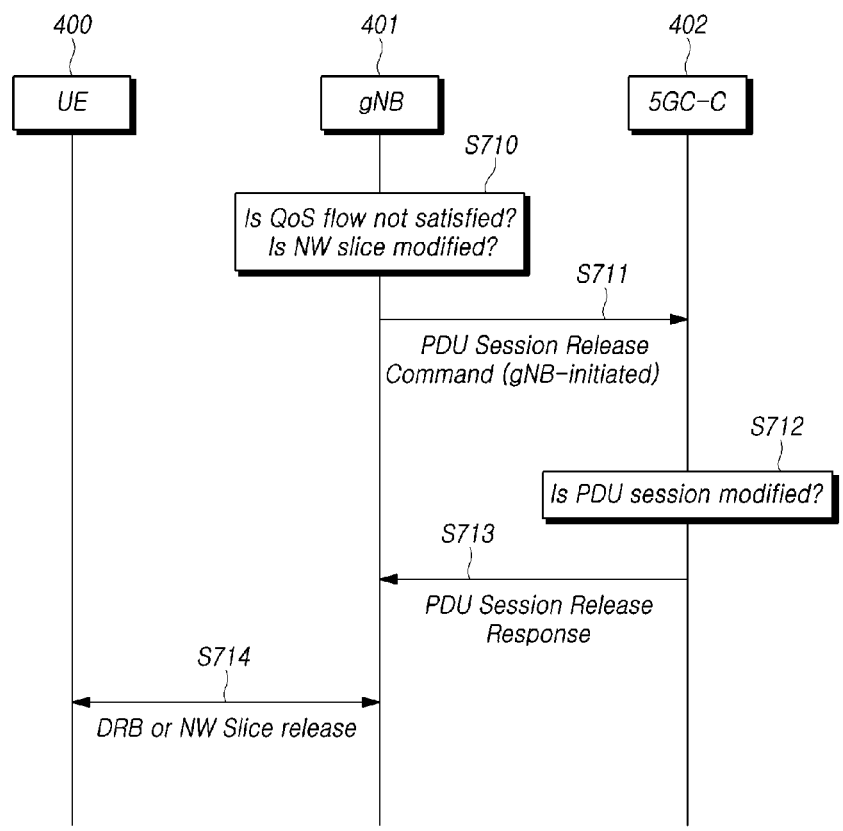
FIG. 7 is a diagram illustrating a PDU session release procedure when a QoS flow does not support a notifying function according to an embodiment.

FIG. 7 is a diagram illustrating a PDU session release procedure when a QoS flow does not support a notifying function in the present embodiment.

Referring to FIG. 7, a base station (gNB) 401 may determine whether a requirement for a QoS flow for a terminal (UE) 400 is not satisfied or whether a modification is made in an NW slice (S710).

When the requirement for the QoS flow is not satisfied or when a modification is made in the network slice, the base station 401 may transmit a PDU session release request message, which is an NGAP message, to a core network entity (5GC-C) 402 as a PDU session resource release message (S711).

Upon receiving the PDU session resource release message described above, the core network entity 402 processes a request for the PDU session release (S712). When the process for the corresponding request is successful, the core network entity 402 transmits a PDU session release response message, which is an NGAP message, to the base station (S713).

On the other hand, upon receiving the PDU session release response message from the core network entity 402, the base station 401 may perform a DRB or NW slice update with the terminal 400 based on the corresponding message (S714).

Embodiment 2: NGAP IE Related to 5G Session Management

An Information Element (IE), which is an information element used for NG-based PDU session management, may include the following fields. That is, the NGAP message used for PDU session management may include the following fields (the message may include combinations of the following fields, and each field may be essentially or selectively used for a specific NGAP message).

1) 5GC-C UE NGAP ID: an identifier for identifying UE connection on an NG interface in the corresponding 5GC-C 2) 5GNB UE NGAP ID: an identifier for identifying UE connection on an NG interface in the corresponding 5G NB 3) PDU Session Modification List: a list of PDU sessions to be modified 4) PDU Session No Modification List: a list of PDU sessions not to be modified 5) PDU Session Release List: a PDU session list to be released 6) PDU Session No Release List: a PDU session list to be released 7) PDU Session ID: a PDU session identifier 8) QoS Flow ID: a QoS flow identifier 9) Slice ID: a network slice Identifier 10) RAB ID: a unique identifier of a radio access bearer for a specific terminal 11) 5G Flow Level QoS Parameters: QoS-related parameters to be applied to a 5G flow (QoS flow IDs capable of classifying/identifying flows having different QoS characteristics may be included)

12) UE Radio Capability: wireless capability and 5G, eLTE, and an LTE values of a UE may be included 13) NAS-PDU: a message to be transmitted between a 5GC-C and a UE without interpretation by the base station 14) GTP TEID: some or all of 5GC-C TEID, 5GC-U TEID, 5G NB TEID, CU TEID, and DU TEID are used 15) Cause: Dissatisfaction Cause for Requirement, Failure Cause for Request 16) 5G UE Type: used to distinguish types of connected 5G UEs (it is possible to classify the types of a standalone UE, a standalone-based interworking UE, a non-standalone-based interworking UE, an LTE-only UE, etc.)

As described above, according to at least one embodiment, in the 5G, a large number of small cell base stations are required in order to stably provide requirements for a high-band frequency, a high-speed transmission rate, high reliability, and low delay and various service scenarios. Therefore, by designing an NG interface as a standard-based open type, it is possible to provide more stable network connectivity through efficient interworking between a 5G core network and a base station of different equipment manufacturers, as well as to reduce a construction cost and an operation cost.

Figure 8:
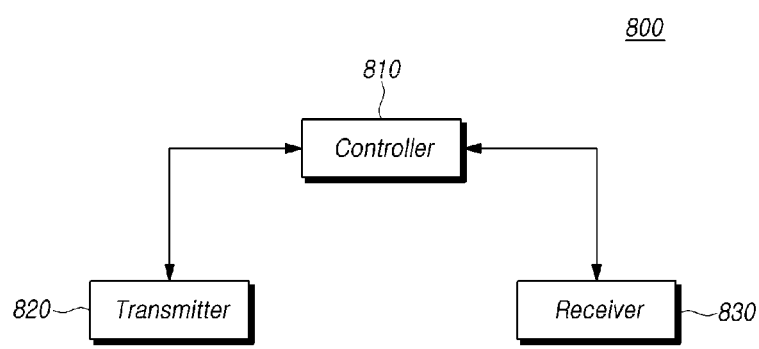
FIG. 8 is a diagram illustrating a base station according to at least one of embodiments.

FIG. 8 is a diagram illustrating a base station according to at least one of embodiments.

Referring to FIG. 8, a base station 800 includes a controller 810, a transmitter 820, and a receiver 830.

The controller 810 may determine whether a QoS requirement for a terminal is satisfied. At this time, as described above, the parameters for the QoS flow may include i) an identifier of the QoS flow, ii) a transmission rate (minimum value/guarantee value/maximum value) of the QoS flow, iii) characteristics of the QoS (Guaranteed Bit Rate (GBR)/Non-Guaranteed Bit Rate (Non-GBR) type depending on whether a specific bandwidth is ensured, priority, packet delay, packet error rate, etc.), iv) Allocation and Retention Priority (ARP) information, and the like.

The controller 810 may modify a data radio bearer connected to the terminal according to one of a PDU session resource modification message and a PDU session resource release message received from the receiver 830 described below.

When it is determined that the requirement of the QoS flow described above is not satisfied, the transmitter 820 may transmit a PDU session resource notification message indicating that the requirement is not satisfied to the core network entity and may transmit a processing result on one of the PDU session resource modification message and the PDU session resource release message, which is received from the core network entity, to the core network entity.

In addition, the PDU session resource notification message described above may include i) the identifier of the QoS flow described above and ii) information on the cause why the requirement of the QoS flow is not satisfied.

At this time, the PDU session resource notification message, the PDU session resource modification message, and the PDU session resource release message described above may be transmitted through an NGAP message. That is, the PDU session resource notification message may be transmitted with a PDU session indication message, which is an NGAP message, the PDU session resource modification message may be transmitted with a PDU session modification request message, which is an NGAP message, and the PDU session resource release message may be transmitted with a PDU session release command, which is an NGAP message.

The receiver 830 may receive one of a PDU session resource modification message and a PDU session resource release message from the core network entity.

The above-described PDU session resource notification message, PDU session resource modification message, and PDU session resource release message may include at least one of a PDU session identifier, a QoS flow identifier, and a network slice identifier as an information element related to PDU session management.

Figure 9:
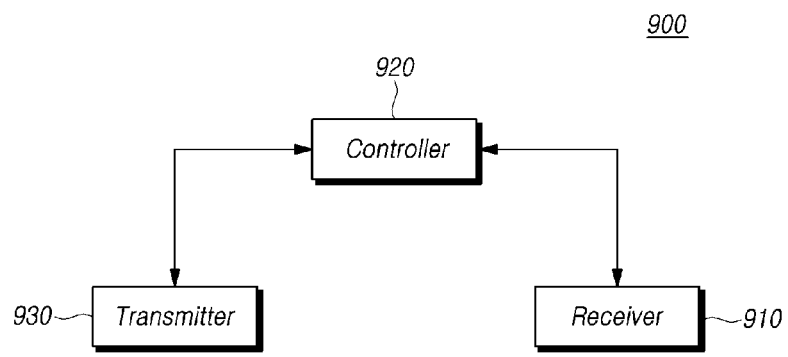
FIG. 9 is a diagram illustrating a core network entity according to at least one of embodiments.

FIG. 9 is a diagram illustrating a core network entity according to at least one of embodiments.

Referring to FIG. 9, a core network entity 900 includes a receiver 910, a controller 920, and a transmitter 930.

The receiver 910 may perform functions of receiving a PDU session resource notification message indicating that the QoS flow requirement for a terminal is not satisfied from a base station, and of receiving a processing result on a PDU session resource modification message or a PDU session resource modification message transmitted from the base station.

At this time, as described above, the PDU session resource notification message, the PDU session resource modification message, and the PDU session resource release message may be transmitted through an NG Application Protocol (NGAP) message. That is, i) the PDU session resource notification message may be transmitted with a PDU session indication message, which is an NGAP message, ii) the PDU session resource modification message may be transmitted with a PDU session modification request message, which is an NGAP message, and iii) the PDU session resource release message may be transmitted with a PDU session release command, which is an NGAP message.

In addition, the PDU session resource notification message described above may include the identifier of the QoS flow described above and information on dissatisfaction cause for the requirement of the QoS flow.

The transmitter 930 may perform a function of transmitting one of a PDU session resource modification message and a PDU session resource release message to the base station.

At this time, the base station may receive one of the above-described PDU session resource modification message and the PDU session resource release message and may modify a data radio bearer connected to the terminal according to one of the PDU session resource modification message and the PDU session resource release message according to the corresponding received message.

The above-described PDU session resource notification message, PDU session resource modification message, and PDU session resource release message may include at least one of a PDU session identifier, a QoS flow identifier, and a network slice identifier as an information element related to PDU session management.

The standard details or standard documents mentioned in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present disclosure.

The above embodiments have been described merely for the purpose of illustrating the technical idea of the present disclosure, and those skilled in the art will appreciate that various modifications and changes are possible without departing from the scope and spirit of the present disclosure. Therefore, the disclosure of the present embodiments is not intended to limit the technical idea of the present embodiments but is intended to illustrate the same, and the scope of the technical idea of the present embodiments is not limited by these embodiments. The scope of the present disclosure shall be construed on the basis of the accompanying claims in such a manner that all of the technical ideas included within the scope equivalent to the claims belong to the present disclosure.

Moreover, the terms "system," "processor," "controller," "component," "module," "interface,", "model," "unit" or the like are generally intended to refer to a computer-related entity, either hardware, a combination of hardware and software, software, or software in execution. For example, a component may be, but is not limited to being, a process running on a processor, a processor, a controller, a control processor, an object, an executable, a thread of execution, a program, and/or a computer. By way of illustration, both an application running on a controller or processor and the controller or processor can be a component. One or more components may reside within a process and/or thread of execution and a component may be localized on one computer and/or distributed between two or more computers.

What is claimed is:

1. A method for managing a Packet Data Unit (PDU) session by a base station, the method comprising:
   determining whether a requirement of a quality of service (QoS) flow for a terminal is satisfied;
   transmitting, to a core network entity, a PDU session resource notification message indicating that the requirement is not satisfied when the requirement is not satisfied;
   receiving one of a PDU session resource modification message for requesting PDU session resource modification and a PDU session resource release message for requesting PDU session resource release from the core network entity; and
   performing one of the PDU session resource modification and the PDU session resource release in response to the received one and transmitting a processing result to the core network entity,
   wherein the PDU session resource notification message, the PDU session resource modification message, and the PDU session resource release message are transmitted through an New Generation-Application Protocol (NGAP) message.

2. The method of claim 1, wherein the PDU session resource notification message, the PDU session resource modification message, and the PDU session resource release message comprise at least one of a PDU session identifier, a QoS flow identifier, and a network slice identifier.

3. The method of claim 1, wherein the PDU session resource notification message includes an identifier of the QoS flow, the requirement of which is not satisfied, and information on dissatisfaction cause for the requirement.

4. The method of claim 1, wherein the base station stores network slice assistance information on the PDU session.

5. The method of claim 1, wherein the base station modifies a data radio bearer connected to the terminal according to one of the PDU session resource modification message and the PDU session resource release message.

6. A method for managing a Packet Data Unit (PDU) session by a core network entity, the method comprising:
receiving a PDU session resource notification message indicating dissatisfaction for a requirement of a quality of service (QoS) flow for a terminal, from a base station;
transmitting one of a PDU session resource modification message for requesting the base station to perform PDU session resource modification and a PDU session resource release message for requesting the base station to perform PDU session resource release to the base station; and
receiving a processing result on one of performing the PDU session resource modification in response to the PDU session resource modification message and performing the PDU session resource release in response to the PDU session resource release message from the base station,
wherein the PDU session resource notification message, the PDU session resource modification message, and the PDU session resource release message are transmitted through an New Generation Application Protocol (NGAP) message.

7. The method of claim 6, wherein the PDU session resource notification message, the PDU session resource modification message, and the PDU session resource release message include at least one of a PDU session identifier, a QoS flow identifier, and a network slice identifier.

8. The method of claim 6, wherein the PDU session resource notification message includes an identifier of the QoS flow, the requirement of which is not satisfied, and information on cause why the requirement is not satisfied.

9. The method of claim 6, wherein the base station stores network slice assistance information on the PDU session.

10. The method of claim 6, wherein the base station modifies a data radio bearer connected to the terminal according to one of the PDU session resource modification message and the PDU session resource release message.

11. A base station for managing a Packet Data Unit (PDU) session, the base station comprising:
a controller configured to determine whether a requirement of a quality of service (QoS) flow for a terminal is satisfied;
a receiver configured to receive one of a PDU session resource modification message for requesting PDU session resource modification and a PDU session resource release message for requesting PDU session resource release from a core network entity; and
a transmitter configured to transmit, to a core network entity, a PDU session resource notification message indicating that the requirement is not satisfied when it is determined that the requirement is not satisfied, and to transmit, to the core network entity, a processing result on one of performing the PDU session resource modification in response to the PDU session resource modification message and performing the PDU session resource release in response to the PDU session resource release message,
wherein the PDU session resource notification message, the PDU session resource modification message, and the PDU session resource release message are transmitted through an New Generation Application Protocol (NGAP) message.

12. The base station of claim 11, wherein the PDU session resource notification message, the PDU session resource modification message, and the PDU session resource release message include at least one of a PDU session identifier, a QoS flow identifier, and a network slice identifier.

13. The base station of claim 11, wherein the PDU session resource notification message includes an identifier of the QoS flow, the requirement of which is not satisfied, and information on cause why the requirement is not satisfied.

14. The base station of claim 11, wherein the base station is configured to store network slice assistance information on the PDU session.

15. The base station of claim 11, wherein the controller modifies a data radio bearer connected to the terminal according to one of the PDU session resource modification message and the PDU session resource release message.

* * * * *